United States Patent Office
3,017,280
Patented Jan. 16, 1962

3,017,280
HARDENING OF COATINGS OF POLYMERS CONTAINING CARBOXYL GROUPS
Joseph Yudelson, Rochester, N.Y., assignor to Eastman Kodak Company, Rochester, N.Y., a corporation of New Jersey
No Drawing. Filed Apr. 20, 1959, Ser. No. 807,288
6 Claims. (Cl. 106—125)

This invention relates to the hardening of carboxyl containing polymers to enhance their resistance to water by incorporating in coating compositions thereof aziridinyl azines containing at least two aziridinyl groups therein.

Various carboxyl containing polymers have been suggested for coating purposes, particularly in photographic products either as protective layers or as the carriers for silver halides in photographic emulsion layers. These polymeric materials have often been characterized by susceptibility to the effect of water, such as would be encountered in the processing of the photographic products. Some hardeners have been proposed for these polymers, such as hydroxyl containing compounds such as glycerol, which hardening has frequently required heating in the presence of strong acidic catalysts. This treatment may be objectionable, particularly where the material is used in a system adversely affected by heat or acidity.

One object of my invention is to provide hardeners for carboxyl containing polymers, which exhibit no detrimental photographic effects. Another object of my invention is to provide materials which, when mixed with carboxyl containing polymers, will render the same resistant to the effects of water of varying pH or of various elevated temperatures. A further object of my invention is to provide for the hardening of carboxyl containing polymers by the use of aziridinyl azine type compounds. Other objects of my invention will appear herein.

Some of the carboxyl containing polymers which are useful in preparing photographic products in the form of their ammonium or alkali metal salts are the following:

(1) Cellulose ether phthalates, succinates, and maleates. The use of these materials as coating materials or as carriers for silver halide in photographic emulsions is described in Talbot and McCleary U.S. Patent No. 2,725,293.

(2) Gelatin to which dicarboxylic acid groups has been imparted. The use of this material for photographic coating is described in U.S. Patent No. 2,525,753 of Yutzy and Frame.

(3) Polyvinyl acetal dicarboxylates. The use of these materials as coatings or as protective colloids for silver halide in photography is disclosed in U.S. Patent No. 2,828,289 of Mench.

(4) Polyvinyl phthalates. The use of this material for coatings in the making of photographic products is disclosed in U.S. Patent No. 2,275,685 of Salo.

(5) Carboxymethyl cellulose.

(6) The polymer of alkyl acrylates or methacrylates and acrylic or methacrylic acid. Copolymers of this type can be prepared by a number of polymerization techniques. In the solution or dope polymerization method, the alkyl acrylate or methacrylate is mixed with the acrylic acid or methacrylic acid in acetone or some other suitable solvent. A catalyst such as azo bis isobutyronitrile is added and the mixture is refluxed until the reaction is substantially complete, which refluxing usually takes place over a 12–18 hour period. The reaction product is precipitated by pouring the solution into water, washing and then dissolving the product in water containing ammonium hydroxide or alkali metal hydroxide. With care the pH of the final solution may be less than 7. These copolymers can also be prepared by an emulsion polymerization technique in which the mixture of monomers is suspended in water by means of a surfactant and a catalyst added to the emulsion. These polymers can also be prepared by the hydrolysis of polyalkyl acrylates under alkaline conditions, the hydrolysis being conducted to the point where the desired degree of conversion is obtained.

(7) Copolymers of polyvinyl methyl ether and maleic acid such as are marketed under the trade name PVM/MA.

The polymeric materials listed above in aqueous solution are useful both as protective layers or antihalation layers in photographic products or their aqueous solutions may be employed as portective colloids for silver halide in the photographic emulsion proper.

I have found that layers of carboxyl containing polymers are rendered resistant to the effects of water even at an elevated temperature by incorporating in the aqueous coating solution or photographic emulsion in which those polymers are used, a compound having an aziridinyl azine structure of the bis or tris type. One type of aziridinyl azine compound which has been found to be useful is that obtained by the reaction of cyanuric chloride with ethylene imine under appropriate conditions. The principal product obtained is triethylene melamine, the preparation of that compound taking place in accordance with the following formula:

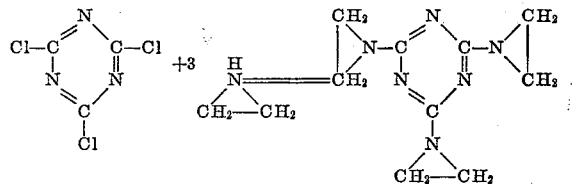

If in the above reaction only two moles of the base are reacted with the cyanuric chloride, there is obtained the di substituted compound. This product is also effective as a hardener for carboxyl containing polymers as are the analogs thereof in which the third chlorine of the cyanuric chloride is replaced by methoxyl, amino, substituted amino, alkylmercapto, or the like. The tris aziridinyl azine hardeners are effective in the case of the water soluble polymers containing at least two carboxyl residues per molecule of polymer. For instance, in the case of a cellulose ether phthalate in which the cellulose might be made up of 20–30 glucose units, it is only necessary that there be at least two carboxyls present for every polymeric cellulose unit. In the case of the bis aziridinyl hardeners it is preferred that there be at least three carboxyls per polymeric molecule.

My invention is conveniently carried out by mixing the aqueous solution of the carboxyl containing polymers with one or more hardeners of the bis or tris aziridinyl azine type. There are no critical limitations on the proportion of aziridinyl azine compound which may be added to the aqueous coating composition. However, as a rule, an amount of those compounds of at least 0.5%, based on the weight of the polymer, gives a pronounced hardening when coated out either as a skin or on a supporting surface. For economical reasons, it is ordinarily desirable to use no more than 5% of the hardening compound in the coating compositions based on the weight of the polymer. Ordinarily, proportions within the range of 1–2% are quite satisfactory for hardening purposes, amounts of this nature giving coatings which harden within a very short period of time, usually one day, and the coatings thus obtained have a swell in water or dilute alkali in room temperature of less than 300–500%. Ordinarily, the carboxyl containing polymers are used in the form of their ammonium salts which appear to be most effective for hardening purposes. The following examples illustrate the use of aziridinyl azine compounds in polymeric coating compositions as described above.

Example 1

There was added to 10 ml. of a 7% aqueous solution of the ammonium salt of poly(ethyl acrylate co acrylic acid) which consisted of 75 mole percent ethyl acrylate and 25 mole percent of acrylic acid was added 0.7 ml. of a 2% solution in water of triethylene melamine. This composition was coated out onto a surface and after drying the coating overnight it was found to be insoluble in hot water and in 2% sodium hydroxide solution. Coatings were made using ¼ the quantity of hardener (0.5% based on the weight of the polymer). The latter coatings, after standing overnight, were also resistant to the effects of hot water and dilute aqueous alkali.

Example 2

0.7 ml. of a 2% solution of triethylene melamine was added to 10 ml. of a 7% solution in water of the ammonium salt of poly(ethyl acrylate co acrylic acid) which consisted of 50 mole percent of ethyl acrylate and 50 mole percent of acrylic acid. This composition was deposited as a coating upon a support therefor. The coating, after drying overnight, was found to be insoluble in hot water and in 2% sodium hydroxide solution.

Example 3

0.7 ml. of a 2% solution of triethylene melamine was added to 10 ml. of a 7% solution in water of polyvinyl phthalate containing 5.7 weight percent of phthaloyl groups. The composition was coated upon a support therefor. After drying the coating overnight, it was found to be insoluble in hot water and in 2% sodium hydroxide solution. A composition was also made in which ½ of the quantity of hardener was employed. The coatings of that composition after drying overnight were likewise insoluble in hot water and in aqueous alkali solution.

Example 4

0.7 ml. of a 2% solution of triethylene melamine were added to 10 ml. of a 7% solution in water of the sodium salt of a phthalated gelatin containing approximately 7 weight percent of phthaloyl groups. This composition was coated out onto a support. The coating thus obtained stood for 2 days at 50% RH and 75° F. The resulting coating was resistant to the effect of hot water.

Example 5

0.4 ml. of a 2% solution of triethylene melamine was added to 10 ml. of a 4% solution in water of ammonium ethyl cellulose phthalate. This composition was applied as a coating onto a surface therefor. The coating was dried overnight under room conditions. It was resistant to the effects of water and of 2% sodium hydroxide solution. A similar composition made with ½ the quantity of hardener used gave coatings likewise exhibiting resistance to water and alkali.

Example 6

0.7 ml. of a 2% triethylene melamine solution was added to 10 ml. of a 7% solution of the ammonium salt of a polyvinyl methyl ether-maleic acid copolymer. The resulting composition was coated out as a layer onto a support therefor. The coating was aged for five days at 50% RH, 75° F. It was insoluble in boiling water and in 2% sodium hydroxide solution.

Example 7

0.7 ml. of a triethylene melamine solution was added to 10 ml. of a 7% solution in water of sodium carboxymethyl cellulose. The composition thus obtained was coated out onto a support therefor and was aged for 8 days at 50% RH and 75° F. The coating was insoluble in hot water. A coating of the carboxymethyl cellulose without the hardener given similar treatment dissolved when treated with hot water.

Example 8

0.7 ml. of a 2% triethylene melamine solution was added to 10 ml. of a 7% solution in water of ammonium salt of poly(butyl acrylate co-acrylonitrile co-acrylic acid) consisting of 36 mole percent of acrylate, 50 mole percent of acrylonitrile, and 14 mole percent of acrylic acid. The composition was coated out onto a support therefore and was dried overnight under room conditions. The coating was insoluble in hot water and in 2% sodium hydroxide solution.

Example 9

0.4 ml. of a 2% triethylene melamine solution was added to 10 ml. of a 4% solution in water of the ammonium salt of poly(ethyl acrylate co-methacrylic acid) which contained 20 weight percent of the acid component. A coating dried overnight under room conditions was insoluble in hot water and in 2% sodium hydroxide solution.

Example 10

0.7 ml. of a 2% triethylene melamine solution was added to 10 ml. of a 7% solution in water of the ammonium salt of poly(butyl methacrylate co acrylic acid) which contained 50 mole percent of acid component. A coating of this composition dried overnight under room conditions was insoluble in hot water and in 2% sodium hydroxide solution.

Example 11

A high contrast, high chloride silver chlorobromoiodide photographic emulsion which contained 43 grams of gelatin per mole of silver halide was mixed in the proportion of 2050 grams thereof and 2750 grams of a 7.87% solution of the ammonium salt of a copolymer of ethyl acrylate and acrylic acid. The emulsion was split into portions of 0.24 mole each, varying amounts of triethylene melamine being added as a hardener. The emulsions thus obtained were coated on conventional polystyrene film base. After 3 weeks aging at 50% RH, 70° F., the following results were obtained upon testing the various films:

| No. | Triethylene melamine, Grams | Emulsion Melting Point, °F. | Swelling, Percent | |
|---|---|---|---|---|
| | | | 5' Developer | 20' Wash |
| 1 | 0 | 86 | (*) | (*) |
| 2 | 0.074 | 212 | 415 | 110 |
| 3 | 0.149 | 212 | 330 | 73 |
| 4 | 0.295 | 212 | 259 | 63 |
| 5 | 0.590 | 212 | 181 | 69 |

*The emulsion layer swelled completely away from the support.

Emulsion coating No. 4 was given a one-second exposure through a step wedge to light of 3000° K. color temperature and was then developed for 2¼ minutes in Kodalith developer and was fixed for 10 minutes in Kodak fixing formula F-5 and was washed with water. The following results were obtained.

| Speed [1] | Gamma | Fog |
|---|---|---|
| 0.09 | 8.4 | .05 |

[1] Log of the exposure at a density of .3 over gross fog.

The efficacy of the hardener in accordance with my invention when incorporated in carboxyl containing polymer compositions, coatings may be determined by placing the coating in water and gradually increasing the temperature of the water and recording the temperature at which the coating disintegrates or melts. In every case where a hardener in accordance with my invention was used in substantial proportion in the polymer compositions the coating withstood melting in water up to a temperature of 212° F. Emulsions containing these hardeners exhibit less fog or at least no more fog than similar emulsions which have not been subjected to hardening. Emulsions containing a hardener in accordance with my invention may also be compared with emulsions having no hardener or other hardeners by determining the percent of swelling of emulsion layers thereof and when washed with water in motion for 20 minutes. The values obtained in one set of determinations are given in the table above.

The polymer coating compositions in which hardeners are incorporated in accordance with the invention may be coated out onto any type of support such as cellulose ester film base, paper, fabric, or the like in the manufacture of photographic products. The hardeners referred to are useful in various kinds of photographic emulsions in which carboxyl containing polymers are employed as the carrier for the silver halide. They may be added to the emulsion either before or after the addition of sensitizing dyes or other sensitizers. These hardeners are useful both in products employed in black-and-white photography and those adapted for color photography.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951, and 2,566,263, issued August 28, 1951.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl) sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950 and 2,739,964, issued March 27, 1956; Brooker and Keyes U.S. Patent 2,493,748, issued January 10, 1950; Sprague U.S. Patents 2,503,776, issued April 11, 1950, and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948, nad 2,450,397, issued September 28, 1948; Heimbach and Clark U.S. Patent 2,444,609, issued July 6, 1948; Allen and Reynolds U.S. Patents 2,713,541, issued July 19, 1955; and 2,743,181, issued April 24 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938 or the polymethylene bis-benzothiazolium salts of Allen and Wilson U.S. Patent 2,694,716, issued November 16, 1954; or the zinc and cadmium salts of Jones U.S. Patent 2,839,405, issued June 17, 1958.

The emulsions may also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions may contain a suitable gelatin plasticizer such as glycerin; a dihydroxy alkane such as 1,5-pentane diol as described in Milton and Murray U.S. application Serial No. 588,951, filed June 4, 1956, now U.S. Patent 2,960,404, issued November 15, 1960; an ester of an ethylene bis-glycolic acid such as ethylene bis(methylglycolate) as described in Milton U.S. application Serial No. 662,564, filed May 31, 1957, now U.S. Patent 2,904,434, issued September 15, 1959; bis-(ethoxy diethylene glycol) succinate as described in Gray U.S. application Serial No. 604,333, filed August 16, 1956, now U.S. Patent 2,940,854, issued June 14, 1960, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may contain a coating aid such as saponin; a lauryl or oleyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)-glutamate as described in Knox and Wilson U.S. patent application Serial No. 600,679, filed July 30, 1956; or a sulfosuccinamate such as tetrasodium N-(1,2-dicarboxyethyl)-N-octadecyl sulfosuccinamate or N-lauryl disodium sulfosuccinamate as described in Knox and Stenberg U.S. patent application Serial No. 691,125, filed October 21, 1957.

The addenda which we have described may be used in various kinds of photographic emulsions. In addition to being useful in X-ray and other nonoptically sensitized emulsions they may also be used in orthochromatic, panchromatic, and infrared sensitive emulsions.. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954, and 2,543,181, issued February 27, 1951; and Yackel et al. U. S. patent application Serial No. 586,705, filed May 23, 1956. They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; Yutzy U.S. Patent 2,756,142, granted July 24, 1956, and Whitmore and Mader U.S. patent application Serial No. 734,141, filed May 9, 1958.

In the preparation of the silver halide dispersions employed for preparing silver halide emulsions, there may be employed as the dispersing agent for the silver halide in its preparation, gelatin or some other colloidal material such as colloidal albumin, a cellulose derivative, or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamine having a combined acrylamide content of 30–60% and a specific viscosity of 0.25–1.5 on an imidized polyacrylamide of like acrylamide content and viscosity as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyano-acetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

If desired, compatible mixtures of two or more of these colloids may be employed for dispersing the silver halide in its preparation. Combinations of these antifoggants, sensitizers, hardeners, etc., may be used.

I claim:

1. A coating composition comprising a polymer in which carboxyl groups are chemically combined therewith having therein as a hardener for the coatings prepared therefrom an aziridinyl azine containing at least two aziridine groups, in an amount at least 0.5%, based on the weight of the polymer.

2. A composition useful for coating purposes, essentially consisting of an aqueous solution of an ammonium salt of the polymer of ethyl acrylate and acrylic acid and 0.5%, based on the weight of the polymer, of triethylene melamine.

3. A composition adapted for coating purposes comprising an aqueous solution of polyvinyl phthalate containing therein at least 0.5%, based on the weight of the polyvinyl phthalate, of triethylene melamine.

4. A composition adapted for coating purposes comprising a water soluble salt of the compound resulting from the union of gelatin and phthalyl containing therein at least 0.5%, based on the weight of the phthalated gelatin, of triethylene melamine.

5. A composition adapted for coating purposes comprising an aqueous solution of cellulose ether phthalate containing therein at least 0.5%, based on the cellulose ether phthalate, of triethylene melamine.

6. A composition adapted for coating purposes comprising a water soluble salt of the polymer of polyvinyl methyl ether and maleic acid containing therein at least 0.5%, based on the weight of the polymer, of triethylene melamine.

References Cited in the file of this patent

UNITED STATES PATENTS 2,842,451   Grummitt et al. _____ July 8, 1958